United States Patent
Kimberly et al.

[11] Patent Number: 5,836,349
[45] Date of Patent: Nov. 17, 1998

[54] BIDIRECTIONAL FLOW CONTROL DEVICE

[75] Inventors: Kevin A. Kimberly, Marietta; John M. Palmer, Cicero, both of N.Y.

[73] Assignee: Carrier Corporation, Syracuse, N.Y.

[21] Appl. No.: 775,468

[22] Filed: Dec. 30, 1996

[51] Int. Cl.⁶ ..................... F16K 17/26
[52] U.S. Cl. ............. 137/493.8; 137/513; 62/324.6
[58] Field of Search ............ 137/493.8, 513; 62/324.6

[56] References Cited

U.S. PATENT DOCUMENTS

| | | | |
|---|---|---|---|
| 2,226,022 | 12/1940 | Shutts | 137/493.8 |
| 2,338,895 | 1/1944 | Boulogne | 137/493.8 |
| 2,748,898 | 6/1956 | Carbon | 137/493.8 |
| 4,440,308 | 4/1984 | Baker | 137/493.8 |
| 5,038,579 | 8/1991 | Drucker | 62/324.6 |
| 5,186,021 | 2/1993 | Keller | 62/324.6 |
| 5,465,752 | 11/1995 | Higgins | 137/513 |

FOREIGN PATENT DOCUMENTS

| | | | |
|---|---|---|---|
| 482016 | 9/1929 | Germany | 137/493.8 |
| 313275 | 12/1933 | Italy | 137/493.8 |

*Primary Examiner*—John Rivell
*Assistant Examiner*—Ramyar Farid

[57] ABSTRACT

A device for controlling or metering fluid flow in either direction through a conduit. The device comprises a shell disposed in communication with the conduit. Disposed within the shell is a body having a pair of metering orifices axially extending therethrough. A valve is disposed within the shell and adapted such that fluid flow in a first direction through the device urges the valve to allow fluid flow through the first metering orifice and closes off the second metering orifice. Upon a flow reversal, the fluid urges the valves means to operate in the opposite manner wherein the first metering orifice is closed off and communication is established through the second metering orifice. The device is adapted for use in a reversible vapor compression air conditioning system. In this application, one metering orifice in the body is sized to provide proper metering for heating mode operation and one metering orifice is sized to provide proper metering for cooling mode operation.

3 Claims, 2 Drawing Sheets

BIDIRECTIONAL FLOW CONTROL DEVICE

BACKGROUND OF THE INVENTION

This invention relates generally to devices for controlling the flow of a fluid within a conduit. More particularly, the invention relates to a device that is capable of controlling the expansion of a fluid, such as a refrigerant for example, in either flow direction through the device. An application for such a device is in a reversible vapor compression air conditioning system, commonly known as a heat pump.

Reversible vapor compression air conditioning systems are well known in the art. A conventional heat pump system has a compressor, a flow reversing valve, an outside heat exchanger, an inside heat exchanger and one or more expansion means for metering flow, all connected in fluid communication in a closed refrigerant flow loop. The inside heat exchanger is located in the space to be conditioned by the system and the outside heat exchanger is located outside the space to be conditioned and usually out of doors. The flow reversing valve allows the discharge from the compressor to flow first to either the outside heat exchanger or the inside heat exchanger depending on the system operating mode. When the heat pump system is operating in the cooling mode, refrigerant flows first through the inside heat exchanger, which functions as a condenser and then through the outside heat exchanger, which functions as an evaporator. When the heat pump system is operating in the heating mode, the reversing valve is repositioned so that refrigerant flows first through the outside heat exchanger and the functions of the two heat exchangers are reversed as compared to cooling mode operation.

All vapor compression refrigeration or air conditioning systems require an expansion or metering device in which the pressure of the refrigerant is reduced. High pressure refrigerant in a supply line enters the metering device through a restrictive orifice wherein the flow rate is slowed and a lesser volume of refrigerant passes through the orifice. The refrigerant then expands to fill the volume in the supply line on the opposite side of the metering orifice. This process is interchangeably called metering, expanding or throttling. In nonreversing systems, the expansion device need only be capable of metering the flow in one direction. In heat pumps and other reversible systems, the refrigerant must be metered in both refrigerant flow directions. It is not satisfactory to use a single capillary tube or orifice in a reversible system, as the metering requirement during cooling mode operation is not equal to the requirement during heating mode operation. A simple capillary or orifice optimized for operation in one mode would give poor performance in the other mode. One known method of achieving the requirement for proper flow metering in both directions is to provide dual metering devices in the refrigerant flow loop between the two heat exchangers. The first metering device, a flow control device such as a capillary or orifice, is installed so that it can meter refrigerant flowing from the inside heat exchanger to the outside heat exchanger (cooling mode). The second metering device, which is similar to the first metering device but optimized for operation in the heating mode, is installed so that it can meter refrigerant flowing from the outside heat exchanger to the inside heat exchanger (heating mode). Check valves are installed in bypass lines around the metering devices and in such an alignment so that refrigerant flow can bypass the first metering device during cooling mode operation and bypass the second metering device during heating mode operation. This arrangement is satisfactory from an operational perspective but is relatively costly as four components are required to achieve the desired system flow characteristics.

It is known in the art to combine in one device the functions of metering in one flow direction and offering little or no restriction to flow in the other. Such a device is disclosed in U.S. Pat. No. 3,992,898. In such a system, two such devices are installed in series in the refrigerant flow loop between the heat exchangers. The first metering device allows free refrigerant flow from the inside heat exchanger to the outside heat exchanger and meters refrigerant flow in the opposite direction to provide optimum metering capacity during cooling mode operation. The second metering device allows free refrigerant flow from the outside heat exchanger to the inside heat exchanger and meters refrigerant flow in the opposite direction to provide optimum metering capacity during heating mode operation. U.S. Pat. No. 4,926,658 discloses the use of a two way flow control device in a reversible vapor compression air conditioning system. As disclosed therein, this flow control device meters the flow of refrigerant in both directions, however it relies on a separate check valve in combination with a conventional expansion valve to properly condition the fluid for the appropriate cycle.

SUMMARY OF THE INVENTION

The present invention is a flow control device for metering fluid, such as refrigerant in its gaseous state as utilized in a reversible vapor compression system, flowing in either direction through the device. In particular, the device allows different metering characteristics for each direction.

The flow control device of the present invention includes a body disposed within a shell. The body has a first metering orifice and a second metering orifice axially extending therethrough and providing communication with the shell. A valve means is disposed within the shell and adapted to alternately establish and close off communication through the metering orifices when urged by the fluid flow. When the valve means is moved by fluid flow in a first direction the valve means allows communication through the first metering orifice, closes off communication through the second metering orifice, and a metered quantity of fluid having reduced pressure exits the device. When the flow of fluid through the device is reversed, fluid first enters through the metering orifice in the second end wall and expands into the internal chamber, the valve means reverses operation and permits fluid flow through the second metering orifice and closes off the first metering orifice. The length of the body and the diameter of the metering orifices are sized to provide the proper metering of fluid flow in the respective direction of fluid flow.

BRIEF DESCRIPTION OF THE DRAWINGS

The accompanying drawings form a part of the specification. Throughout the drawings, like reference numbers identify like elements.

DESCRIPTION OF THE PREFERRED EMBODIMENTS

Figure 1:
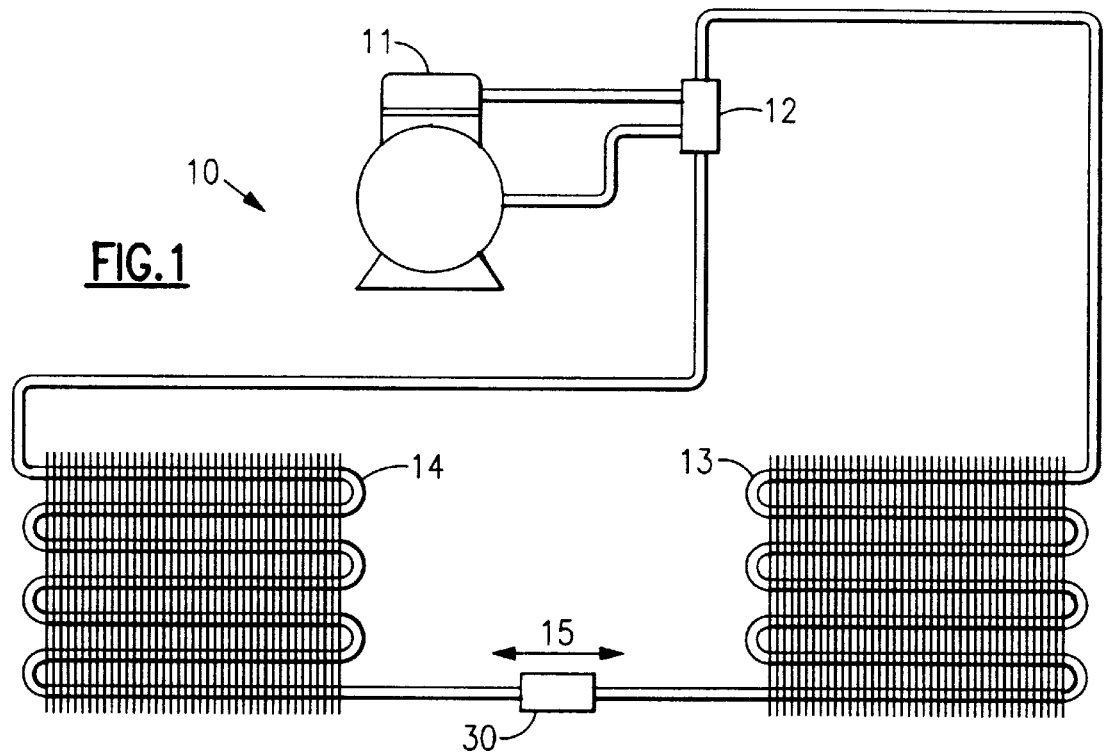
FIG. 1 is a schematic representation of a reversible vapor compression air conditioning system employing the flow control device of the present invention.

Referring to FIG. 1, there is illustrated a reversible vapor air conditioning system for providing either heating or cooling incorporating the bidirectional fluid control device 30 of the present invention. The system includes a first heat exchanger unit 13 and a second heat exchanger unit 14. In a heating mode of operation the fluid flow 15 is from left to right. In the heating mode heat exchanger 14 functions as a conventional condenser within the cycle while heat exchanger 13 performs the duty of an evaporator. In the heating mode of operation the fluid, refrigerant, passing through the supply line is throttled from the high pressure condenser 14 into the low pressure evaporator 13 in order to complete the cycle. When the system is employed as a heat pump the direction of the refrigerant flow is reversed and the function of the heat exchangers reversed by throttling refrigerant in the opposite direction. The flow control device of the present invention is uniquely suited to automatically respond to the change in refrigerant flow direction to provide the proper throttling of refrigerant in the required direction.

The bidirectional flow control device 30 of the present invention comprises a generally cylindrical shell 31 with a body 51 coaxially fixedly positioned in the shell. Device 30 may be configured in several variations. It may be sized so that its outer diameter is slightly smaller than the inner diameter of the tube that connects heat exchangers 13 and 14. During manufacture of the system, device 30 is inserted into the tube and the tube is crimped around the body 51 so that the device cannot move within the tube. Alternatively, the device can be manufactured with threaded or braze fittings, not shown, at both ends so that it may be assembled into the connecting tube using standard joining techniques.

Figure 2:
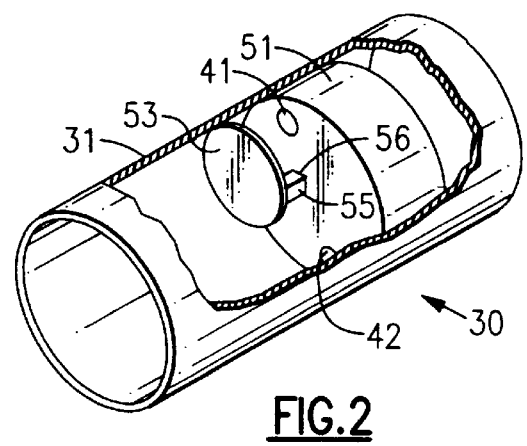
FIG. 2 is an isometric view in partial section of the flow control device of the present invention incorporated in the system illustrated in FIG. 1.
Figure 3:
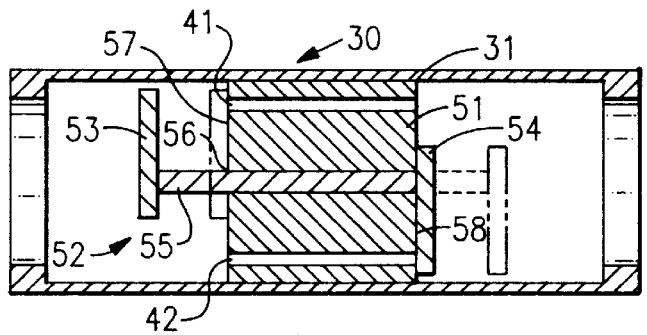
FIG. 3 is a plan view in section of the flow control device of the present invention incorporated in the system illustrated in FIG. 1.

Referring now to FIG. 2 and FIG. 3, in the embodiment of the device 30 depicted therein, the body 51 has a pair of metering orifices 41, 42 and a mounting hole 56 extending axially therethrough. A shuttle valve 52 is mounted within the body 51 by means of an actuation rod 55 slidably engaged within mounting hole 56. The shuttle valve further comprises a pair of flat plates 53, 54 mounted on either end of the actuation rod 55. The actuation rod 55 is longer than the body 51 to allow for axial translation and has a non-circular cross section, such as for example a square cross section, to prevent rotation within the body. The body is provided with two flat and parallel end faces 57, 58. Plate 53 is adapted to arrest against end face 57 and seal off metering orifice 41 and plate 53 is adapted to arrest against end face 58 and seal off metering orifice 42. The metering orifice 41 is sized properly to meter refrigerant fluid flow when the system 10 is operating in the heating mode and metering orifice 42 is properly sized for the cooling mode.

In operation in a reversible flow air conditioning system such as shown in FIG. 2, the bidirectional flow control device 30, controls the flow of refrigerant fluid flow between the heat exchangers 13, 14. When the system 10 is operating in the cooling mode the fluid flow 15 moves as indicated from heat exchanger 13 to heat exchanger 14. Under the influence of the flowing refrigerant, the shuttle valve 52 is moved to the left (when viewing FIG. 1) and plate 54 arrests against end face 58. Refrigerant flows through metering orifice 41 and expands as it exits the device to throttle the refrigerant from the high pressure side of the system to the low pressure side. Similarly, when the system is operated in the heating mode the cycle is reversed, the refrigerant is caused to flow in the opposite direction, the shuttle valve is automatically moved to the right (when viewing FIG. 1), plate 53 arrests against end face 57 whereby metering orifice 41 is closed off and the refrigerant is properly metered through orifice 42.

Figure 4:
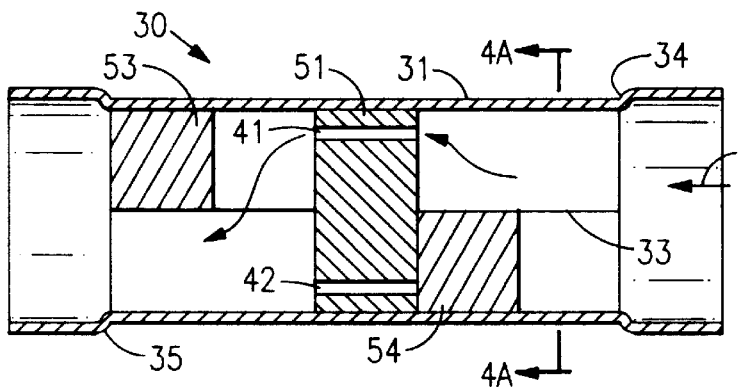
FIG. 4 is a plan view in section of another embodiment of the flow control device of the present invention.
Figure 4A:
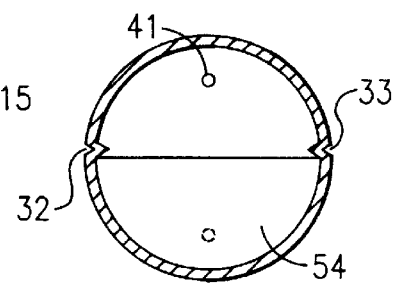
FIG. 4A is a cross-sectional plan view taken substantially along section lines A—A in FIG. 4.

Another configuration of the device 30 is shown in FIG. 4 and FIG. 4A. In this embodiment, tube 31 forms the shell of device 30. Body 51 is similar in construction to that described in FIG. 2 and FIG. 3 except that it lacks the mounting hole 56. The body 51 is fixedly positioned within the tube and held in place by a pair of crimps 32, 33 positioned longitudinally in the tube. Pistons 53 and 54 have a semi-circular cross section and are positioned on either side of body 51. The pistons are positioned within the tube 31 and are slidably mounted and rotationally restrained between the crimps 32 and 33. The tube further has a pair of crimps 34, 35 at either end to provide stops for the pistons. When the system 10 is operating in the cooling mode the fluid flow 15 moves as indicated. Under the influence of the flowing refrigerant, both of the pistons move to the left (when viewing FIG. 4). Piston 54 moves is arrested against body 51 and closes off metering orifice 42 and piston 53 moves against crimp 53 allowing the refrigerant to pass through metering orifice 41. Refrigerant flows through metering orifice 41 and expands as it exits the device to throttle the refrigerant from the high pressure side of the system to the low pressure side. Similarly, when the system is operated in the heating mode the cycle is reversed, the refrigerant is caused to flow in the opposite direction, the pistons automatically move to the right (when viewing FIG. 4), piston 53 arrests against body 51 whereby metering orifice 41 is closed off and the refrigerant is properly metered through orifice 42 and piston 54 is stopped against crimp 34.

Figure 5:
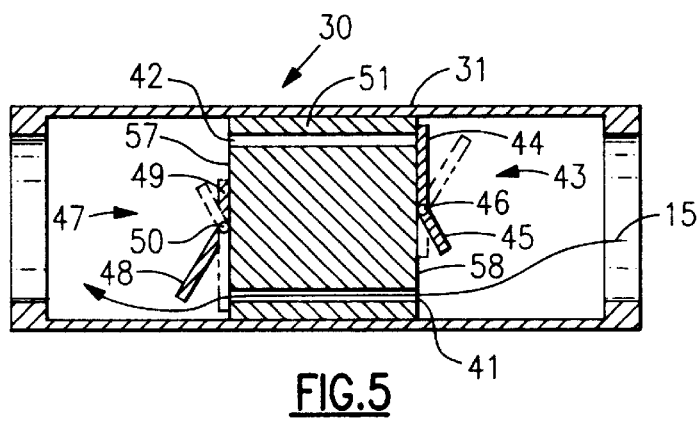
FIG. 5 is a plan view in section of another embodiment of the flow control device of the present invention.

Still another configuration of device 30 is shown in FIG. 5. Body 51 is similar in construction to that described in FIG. 2 and FIG. 3, except that it lacks the mounting hole 56, and is fixedly positioned within the shell 31. Reed valves 43, 47 are positioned on either side of body 51. The reed valves are comprised of a sealing flap 44, 48, a hinge 46, 50, and a stop 45, 49. When the system 10 is operating in the cooling mode the fluid flow 15 moves as indicated in FIG. 5. Under the influence of the flowing refrigerant, reed valve 43 pivots on hinge 46 and flap 44 comes into contact with end face 58 and seals off metering orifice 42.

Refrigerant flows through metering orifice 41 and urges reed valve 47 to pivot on hinge 50 until stop 49 comes into contact with end face 57. With reed valve 47 against the stop refrigerant flows through metering orifice 41 and expands as it exits the device to throttle the refrigerant from the high pressure side of the system to the low pressure side. Similarly, when the system is operated in the heating mode the cycle is reversed, the refrigerant is caused to flow in the opposite direction, the reed valves pivot to the opposite positions whereby flap 48 closes off metering orifice 41, reed valve 43 pivots against stop 45 and the refrigerant is properly metered through orifice 42.

What is claimed is:

1. A device for controlling the flow of a fluid in a conduit in a first and second direction comprising:

a shell defining a fluid flow passageway in flow communication with the conduit;

a single metering body fixedly positioned within the fluid flow passageway, the body having a first metering orifice and a second metering orifice axially extending therethrough in communication with the fluid flow passageway and having a mounting hole passing therethrough;

valve means for selectively allowing flow communication through the first metering orifice in a first direction while sealing off flow communication through the second metering orifice or through the second metering orifice in a second direction while sealing off flow communication through the first metering orifice, said valve means having a rod slidably positioned within and extending through the mounting hole and a pair of pistons secured on either end of the rod with a first of the pistons operatively associated with the first metering orifice and a second of the pistons operatively associated with the second metering orifice;

said valve means operative directly in response to fluid flow, whereby said valve means establishes communication through the appropriate metering orifice according to the direction of the fluid flow.

2. A reversible vapor compression air conditioning system having a compressor, a first heat exchanger and a second heat exchanger being selectively connected to the compressor, switching means for selectively connecting the inlet and discharge side of the compressor between the exchanger and a refrigerant supply line for delivering refrigerant from one exchanger to the other, the switching means comprising:

a flow control device mounted in the supply line between each exchanger having a shell disposed in communication with the conduit;

a single metering body fixed positioned within the shell having a first metering orifice and a second metering orifice axially extending therethrough in communication with the conduit passageway and having a mounting hole passing therethrough;

valve means for selectively allowing flow communication through the first metering orifice in a first direction while sealing off flow communication through the second metering orifice or through the second metering orifice in a second direction while, sealing off flow communication through the first metering orifice, said valve means having a rod slidably positioned within and extending through the mounting hole and a pair of pistons secured on either end of the rod with a first of the pistons operatively associated with the first metering orifice and a second of the pistons operatively associated with the second metering orifice;

said valve means operative directly in response to fluid flow, whereby said valve means establishes communication through the appropriate metering orifice according to the direction of the fluid flow and permits the fluid to flow into the supply line.

3. A reversible vapor compression air conditioning system as set forth in claim 1 wherein a portion of the supply line comprises the shell.

* * * * *